Aug. 29, 1939.  H. R. HAWGOOD  2,171,325
FINISHING TOOL
Filed Jan. 30, 1935
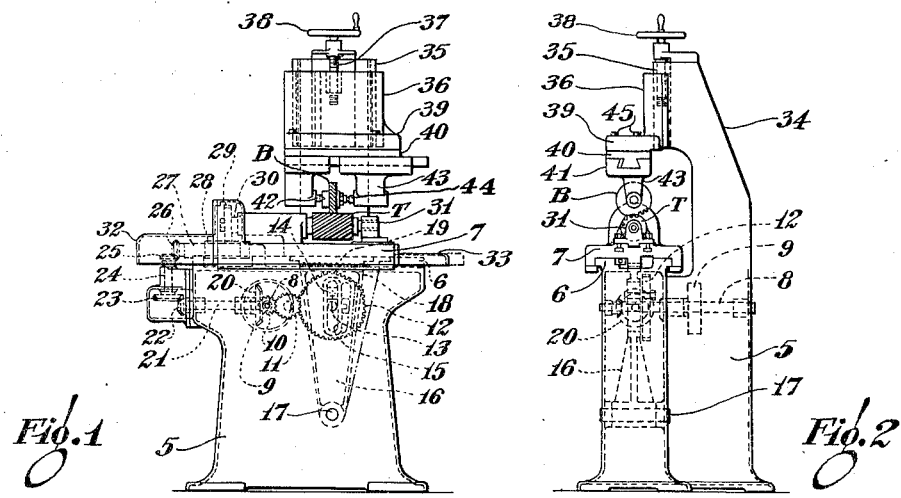
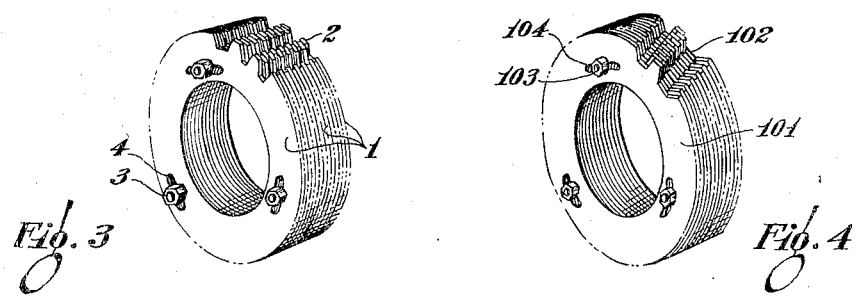
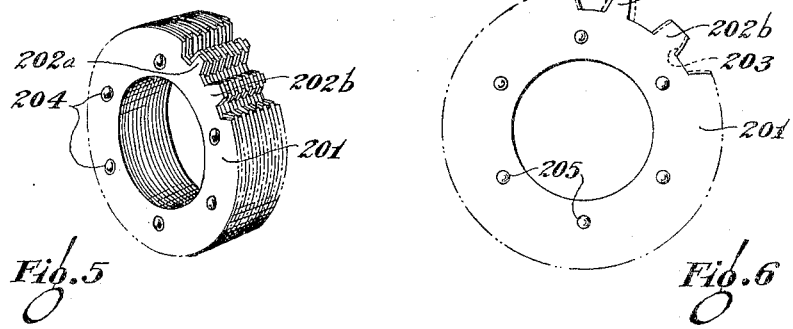
INVENTOR.
Harvey R. Hawgood
BY
Hawgood and Van Horn
ATTORNEYS Patented Aug. 29, 1939

2,171,325

UNITED STATES PATENT OFFICE 2,171,325

FINISHING TOOL

Harvey R. Hawgood, Cleveland, Ohio, assignor to The Lees-Bradner Company, Cleveland, Ohio, a corporation of Ohio Application January 30, 1935, Serial No. 4,135

3 Claims. (Cl. 29—104)

This invention relates to a tool for finishing teeth of gears and other grooved articles.

An object of the invention is to provide an improved tool for use in finishing the surfaces of such articles.

Another object is to provide an improved tool which may easily be fabricated.

Another object is to provide an improved tool which may readily be made from similar parts.

Another object is to provide an improved tool which may compensate for wear.

Other objects will hereinafter appear.

The invention will be better understood from several practical embodiments thereof, illustrated in the accompanying drawing, in which;

Figure 1 is a front elevational view of a machine arranged for finishing the teeth of gears and showing a helical gear being finished by means of a helical tool;

Figure 2 is a side elevational view of the machine of Figure 1;

Figure 3 is a perspective view of a complete tool constituting one embodiment of this invention, this tool having its teeth parallel its axis;

Figure 4 is a view similar to Figure 3 but showing a tool having helically disposed teeth;

Figure 5 is a view similar to Figures 3 and 4 of a tool constituting a third embodiment of the invention; and Figure 6 is an elevation of a single lamination of the tool of Figure 5.

Heretofore, gear teeth have been finished by rolling a blank, in which the teeth to be finished have been roughed out, as though it were in mesh with a tool having working surfaces in the shape of the teeth of a gear with which the gear to be produced would mesh, the metal of the blank being either worn away by the use of an abrasive, as in a lapping operation, or displaced or swaged into a finished form. Such methods and apparatus for performing them are well illustrated in the prior patents of Charles H. Schurr, Nos. 1,642,179, 1,697,823, 1,712,095, and 1,745,344; and it is now understood that if a tool having involute shaped teeth be rolled in contact with the teeth of a blank, it may be used to produce upon the teeth of the blank corresponding or conjugate involute surfaces, and that these surfaces, formed, as they are, by the generative action of the teeth of the tool, are much more accurate in contour than would be teeth produced by a formed tool designed to fit the spaces between the teeth.

In the illustrated application of the present invention a tool is provided which in cross-section corresponds exactly to a gear which would mesh with the gear it is desired to produce. This tool is of a length considerably in excess of the blank on which it is to operate.

In Figure 3 is shown a tool made up of a series of identical laminations 1 arranged as illustrated in Figure 4 in contact with each other and with their teeth 2 slightly staggered. Each tooth of each lamination is slightly smaller than would be the tooth of a gear designed to mesh properly with the finished gear which it is desired to produce. The laminations are, however, so arranged that the outer surfaces of the projecting laminations on each side lie in the surfaces of the teeth of a completed gear which would properly mesh with that to be produced from the work piece or blank.

After the laminations have been arranged as indicated in this figure, the entire series is secured together by any desired means as by bolts and nuts 3 passing through perforations 4 therein which perforations may conveniently be elongated as indicated so that the discs may be rearranged as desired and the teeth caused to extend further beyond each other to compensate for wear upon their cutting edges.

The teeth may be produced by forming a stack of circular blanks into which the grooves between adjacent teeth may be cut by hobbing, grinding, or in any other desired manner similar to the formation of teeth in a gear. The toothed laminations can also conveniently be produced by stamping them from sheet metal stock by means of suitable dies.

After being so formed, a series of laminations is arranged with the teeth in staggered relation, these teeth extending beyond those of the adjacent laminations a trifle further than would be necessary to cause their edges to lie in the tooth surfaces of a gear conjugate to that which would be produced. These discs are then secured together by tightening the nuts upon the bolts and the edge or working surfaces of the teeth again ground or cut to insure accuracy of form and of relative position.

The edges of the laminations are sharp cornered and thus effectively work the material of the gear blank.

In operation, the gear blank is placed in mesh with the tool, and one or the other driven to rotate both. Of course, both may be driven, and they may be positively geared together if desired. As the two rotate, the blank and tool are moved relative each other in the general direction of the axis of one of them, so that the meshing teeth will be drawn along each other. The tool and blank may be moved to bring their axes closer together, so that the teeth are tightly pressed upon each other. This results in a cutting of the surfaces of the gear blank teeth by the grooved edges of the tool, the operation being somewhat similar to, and, in a sense, lying between filing, hand scraping, and broaching.

In Figure 4 laminations 101 of the type shown in Figure 3 are arranged to form a cutter having helically disposed teeth instead of teeth parallel to its axis. These laminations may be formed in exactly the same manner as those of Figure 3, with the edges parallel their axes and may have these edges ground to lie upon the surfaces of helically disposed teeth.

In Figures 5 and 6 a further modification of lamination is illustrated which also makes it possible to produce a cutter composed entirely of identical laminations and having a grooved or serrated series of teeth which will effectively finish by the type of scraping action upon the teeth of a gear above described. In this form, the laminations 201 have teeth spaced to fall centrally in alignment with those of a gear which would mesh with the gear to be produced. The edges of every other tooth 202a of the lamination lies within the profile 203 of the tooth of such gear while those of the immediate teeth 202b of the laminations lie slightly without this profile.

These laminations are arranged in a series with each successive lamination displaced angularly by the distance between successive teeth so that each narrow tooth 202a will lie between two full sized teeth 202b, as indicated in Figure 5, and after securing the laminations together the outer surfaces of the wider teeth 202b are finished by grinding or in any other desired manner to bring them accurately into the tooth surfaces of a gear which would mesh with the gear to be produced.

The laminations in Figure 5 are shown as secured together by rivets 204 which pass through circular holes 205 closely embracing the rivets, as this tool is not adapted for readjustment in the manner of the tool in Figure 3.

It will, however, be understood that any other desired means, such as welding, might be used to hold the laminations in assembled position.

It will be apparent that in all embodiments of the invention, each tooth is effectively supported throughout its entire height by the teeth behind it, and that a series of cutting edges are provided, there being one cutting edge on each side of each tooth at every alternate lamination throughout the length of the tool.

In Figures 1 and 2 a machine is shown having a base 5, adapted to stand upon the floor, which has upon its upper surface horizontal ways 6 upon which is slidably mounted a table or carriage 7. A shaft 8 is journalled in the base and may be driven through a belt applied to a pulley 9, by a motor, or any other suitable driving means.

The shaft 8 is provided with a pinion 10 meshing with an idler 11, which, in turn, meshes with and drives a gear 12 also journalled within the base. The gear 12 carries a crank 13 journalled in a sliding block 14 which is arranged to reciprocate within a slot 15 formed in a sector 16, pivoted within the base upon a shaft 17. The upper end of the sector is provided with teeth 18 meshing with a rack 19 secured to the underside of the carriage 7, so that as the shaft 8 is rotated, the carriage will be caused to reciprocate along the ways.

A bevelled pinion carried by the shaft 8 meshes with a bevelled gear 20 secured to a shaft 21 carried by bearings within the base and parallel to the ways. The other end of this shaft is provided with a bevelled pinion 22 meshing with a bevelled gear 23 keyed to a vertical shaft 24. The upper end of the vertical shaft carries a bevelled pinion 25 meshing with another bevelled pinion 26 at the end of a horizontal shaft 27, the latter being secured in bearings upon the upper surface of the base. The shaft 27 has formed therein an elongated pinion 28 with which a gear 29 is in mesh. The gear 29 is secured to the end of a spindle 30 journalled on the carriage and adapted to carry the tool T, the other end of the spindle being supported in a bearing 31 adjustably secured to the upper surface of the carriage.

Hence, as the carriage reciprocates, gear 29 may slide along pinion 28, but at all times the rotation of the pinion will be transmitted to the spindle. Suitable covers or guards 32 and 33 are attached to the carriage to protect the ways 6 and gears 25 and 26.

The base has formed integrally therewith an upwardly extending column 34 upon which are formed vertical ways 35. Slidable upon these ways is a slide or carriage 36, which may be manually moved up and down by a screw 37 operated by hand wheel 38. While a manual feed has been shown, it will be understood that an automatic feed would probably be provided in practice, being arranged to move the carriage down the ways at a very slow rate of speed.

The lower end of the slide is provided with a flange 39 to which is secured the flange 40 of a tool support 41 which has a stationary bearing supporting a center 42 and an adjustable tailstock 43 provided with a center 44 and which may be clamped in position by a bolt or like device. The work blank or gear B is shown as supported between these centers. The flanges 39 and 40 are adjustably clamped together by bolts 45, so that the axes of centers 42 and 44 may be angularly adjusted about a vertical axis.

By this means, the axis of the centers may be adjusted angularly with respect to that of spindle 30, so that these axes may be positioned parallel as indicated in Figures 1 and 2, in which is shown a tool corresponding to a helical gear conjugate to that being produced from the work piece, or the tool of Figure 3 having teeth parallel its axis may be used to work a helical work piece by inclining the axis of the latter to that of the former by the amount of the helix angle. Similarly, helical tools may be used to work blanks of any or zero helix angle by relatively adjusting the axis of the work and tool.

With a tool and work gear such as illustrated in Figures 1 and 2, having their axes parallel, it is probably most convenient to mount the work gear between the centers 42 and 44 and the tool upon spindle 30. However, it will be obvious that the same operation would be performed if these parts were mounted in reversed positions, namely;—with the tool between centers 42 and 44 and the work gear upon spindle 30.

Whenever the axes of the tool and work are not parallel, the work should be mounted upon the spindle 30, so that the relative reciprocation of work and tool will be in the direction of the axis of the work rather than that of the tool. By performing the finishing operation in this manner, the cutting is distributed uniformly along the work gear, insuring uniformity in size and contour of the teeth throughout their length.

It will be readily apparent that as shaft 8 is rotated, the carriage is caused to slide back and forth and the spindle 30 is continuously rotated. The rotation of the tool or work supported by the spindle, of course, produces the rotation of the work or tool with which it is in mesh, and the feed is accomplished by lowering the slide 36 by rotating hand wheel 38 until the teeth of the work gear have been cut to the desired extent.

While I have described several illustrated embodiments of my invention in some particularity, obviously many others will readily occur to those skilled in this art, and I do not, therefore, limit myself to the precise details shown and described but claim as my invention all embodiments, variations and modifications thereof coming within the scope of the appended claims.

I claim:

1. A finishing tool comprising a generally cylindrical body consisting of a plurality of identical tooth laminations of substantially uniform thickness throughout, each tooth of each lamination having one edge surface lying in the face contour of the teeth of a gear conjugate to that to be produced, and its opposite edge surface lying substantially within said contour, the teeth being alternately arranged so that every other lamination in a single tooth of the tool has one surface lying in one face contour of said tooth, and so that the remaining tooth laminations each have one edge surface lying in the opposite face contour of said tooth, and means securing said laminations together.

2. A finishing tool comprising a generally cylindrical body consisting of a plurality of identical toothed laminations of substantially uniform thickness throughout, each tooth of each lamination having one edge surface lying in the face contour of the teeth of a gear conjugate to that to be produced, and its opposite edge surface lying substantially within said contour, the teeth being alternately arranged so that every other lamination in a single tooth of the tool has one surface lying in one face contour of said tooth, and so that the remaining tooth laminations each have one edge surface lying in the opposite face contour of said tooth, elongated slots through said laminations, and bolts through said slots clamping said laminations together.

3. A finishing tool comprising a plurality of toothed laminations of substantially uniform thickness throughout, each tooth of each lamination having two cutting edges on one side, the contacting teeth of alternate laminations having the cutting edges on opposite sides, said cutting edges projecting beyond the adjacent laminations.

HARVEY R. HAWGOOD.